DUAL TYPE PHONOGRAPH PICKUP FOR BINAURAL SOUND

Filed Dec. 18, 1959

INVENTOR.
ENRICO E. PENNUCCI
BY
Zoltan Polachek
ATTORNEY

INVENTOR.
ENRICO E. PENNUCCI
BY Zoltan P. Holachek
ATTORNEY

INVENTOR.
ENRICO E. PENNUCCI
BY
Zoltan H. Polachek
ATTORNEY

United States Patent Office 3,120,393
Patented Feb. 4, 1964

3,120,393
DUAL TYPE PHONOGRAPH PICKUP FOR BINAURAL SOUND

Enrico E. Pennucci, 1470 Washington Ave., Bronx, N.Y.
Filed Dec. 18, 1959, Ser. No. 860,532
5 Claims. (Cl. 274—23)

This invention relates to the art of phonograph pickups and more particularly concerns an improved pickup arm and cartridge structure.

According to the invention there is provided an improved pickup including a cartridge unit consisting of a cartridge member and support or holder therefor; the cartridge member is slidably insertable in the support which is pivotally mounted on a pickup arm. The cartridge member carries a plurality of styli or needles for tracking a single groove or two adjacent grooves in a phonograph record, depending on the manner in which the recording was impressed on the record. The cartridge member and its support are mounted on a pickup arm adapted to pivot the cartridge unit automatically when the arm is lifted up at the end of play of a record to position the cartridge unit properly for starting play of another record or the same record. The cartridge unit is adapted for use on delayed monaurally recorded records, delayed stereo recorded records and on standard monaural and stereo records. The invention may employ a dual monaural cartridge with two preamplifiers and with a single amplifier. The invention may also employ a dual stereo cartridge in a single unit to drive two monaural channels, two stereo channels, two delayed monaural channels or two delayed stereo channels, depending on the setting of a switching means connected in circuit with the cartridge.

It is therefore a principal object of the invention to provide a dual type cartridge for playing delayed monaural and delayed stereo phonograph records.

It is a further object to provide a dual type cartridge for a pickup arm adapted to pivot the cartridge automatically to proper playing position.

It is a still further object to provide a dual type cartridge and switching circuit so that the cartridge can drive two independent monaural channels, two stereo channels, two independent delay recorded monaural channels, and two delay recorded stereo channels.

It is also an object to provide a cartridge holder assembly with means for controlling the position of the styli of the cartridge.

Another object is to provide a pickup construction adapted to cooperate with dual magnetic, ceramic, piezoelectric crystal, capacitance, inductive or other types of electromechanical elements for dual needle use in single groove or adjacent groove tracking on a phonograph record.

For further comprehension of the invention, and of the objects and advantages thereof, reference will be had to the following description and accompanying drawings, and to the appended claims in which the various novel features of the of the invention are more particularly set forth.

In the accompanying drawings forming a material part of this disclosure:

Figure 17:
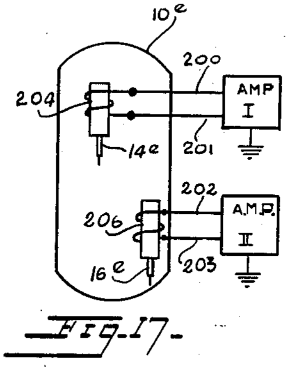
Figure 18:
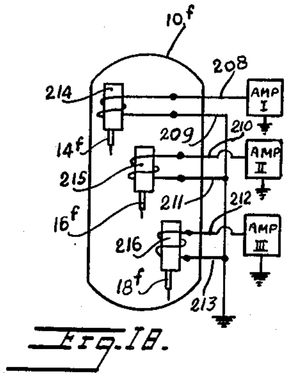
Figure 19:
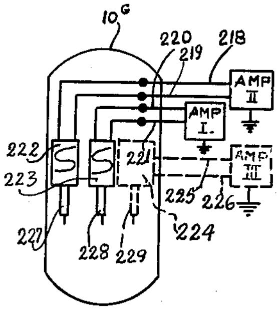

FIGS. 17 to 19, inclusive, are diagrams of various forms of cartridges for adjacent tracking which may be employed in the invention.

Figure 1:
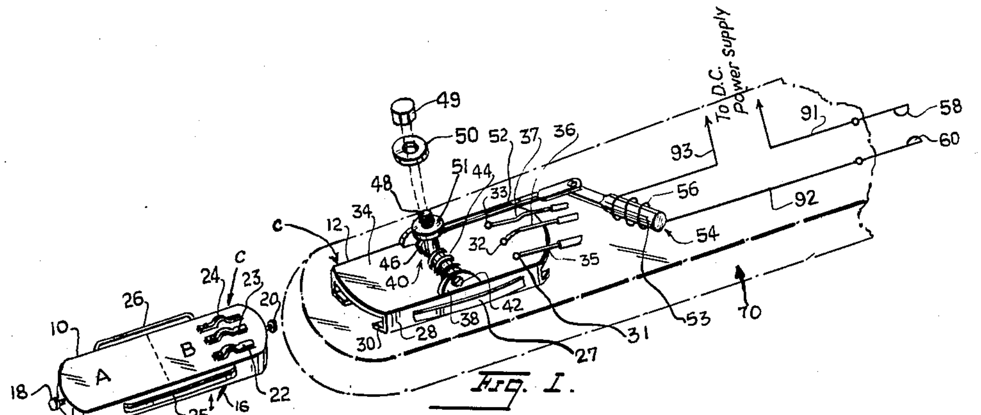
FIG. 1 is an exploded perspective view partially schematic in form of a cartridge structure made according to the invention, with a pickup arm shown in dotted outline.
Figures 3, 4, 5, 7:
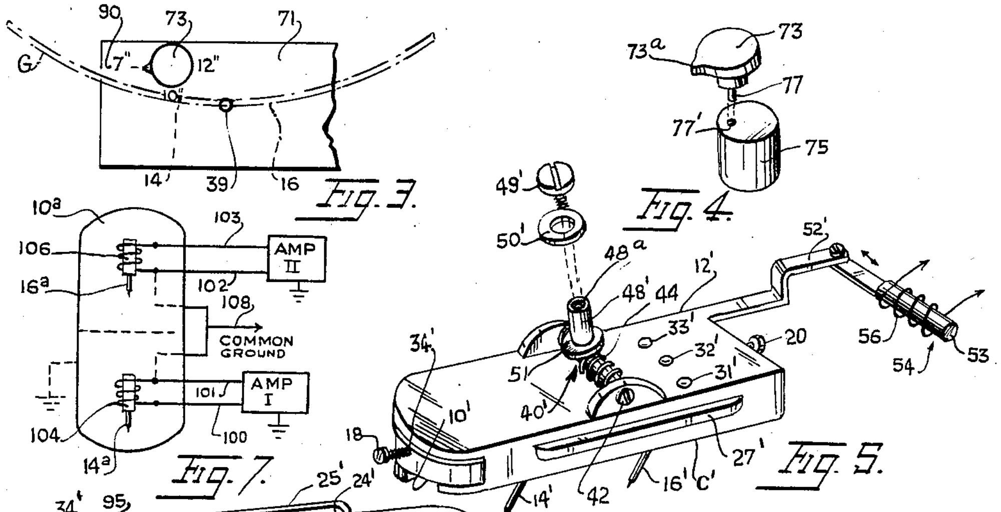
FIG. 3 is a fragmentary plan view of a portion of the pickup arm.
FIG. 4 is an exploded perspective view of a cam member employed in the pickup arm.
FIG. 5 is a perspective view on an enlarged scale of a cartridge unit made according to a modification of the invention.
FIGS. 7–10 are diagrams of various forms of dual type cartridges which may be employed in the invention.

Referring to FIG. 1, there are shown parts of a phonograph cartridge unit C including a cartridge body 10 and cartridge holder 12. The body 10 includes a casing 11 which is rather elongated and substantially rectangular in form and carries electromechanical elements A and B respectively supporting two styli 14 and 16. The styli are respectively adapted to excite the elements A and B electrically by the mechanical vibrations imparted to the styli. One stylus is adapted to vibrate 45° on one side of the groove G and to move up and down in a vertical plane as indicated by the double-headed arrow H, and the other stylus is adapted to vibrate 45° on the other side of the groove G so that when the styli are tracking a single stereo recorded groove G as indicated in FIG. 3, one stylus will optionally pick up 45° engraved recorded signals and the other stylus will pick up the other 45° engraved signals opposite the other 45° recorded signals. Both 45° channels are 90° from each other.

Screws 18 and 20 removably secure the styli needles in the body 10. The casing 11 is an insulated member and has on its upper surface three bowed leaf springs 22–24. Springs 22 and 24 may be connected to separate electrodes of the two elements A and B and spring 23 may be connected to a common electrode of the elements. Elongated springs 25, 26 are mounted on opposite sides of the casing 11 and are adapted to fit into grooves 27 pressed out of or in the side walls 28 of cartridge holder 12. The cartridge holder is formed of insulation material such as plastic, metal composition or the like. Walls 28 are provided with inwardly extending sections 30 to define two channels into which the cartridge body 10 can be inserted.

Three electrical contacts 31–33 are secured to the flat top 34 of the holder and are located so that they can be contacted by the upper bowed portions of leaf springs 22–24, respectively. Lead wires 35–37 are connected to the respective contacts 31–33. On the top 34 of the holder are two bracket ears 38 apertured to receive laterally extending arms of a T-bar 40. Screws 42 are threaded in the ends of the arms of bar 40. Coil springs 44, 46 are mounted on the arms and balance the assembly of cartridge and holder on the T-bar. The T-bar is threaded at the upper end of its shank 48 to receive a cap nut 49 and washer 50. Flange 51 is formed integrally with shank 48. A rod 52 is attached to the shank 48 and extends perpendicularly to it. The rod has a free end pivotally connected to a plunger 53 of a solenoid 54. The coil 56 of the solenoid is in circuit with a pair of contacts 58, 60 carried on the pickup arm assembly 70 which will now be described.

Figure 2:
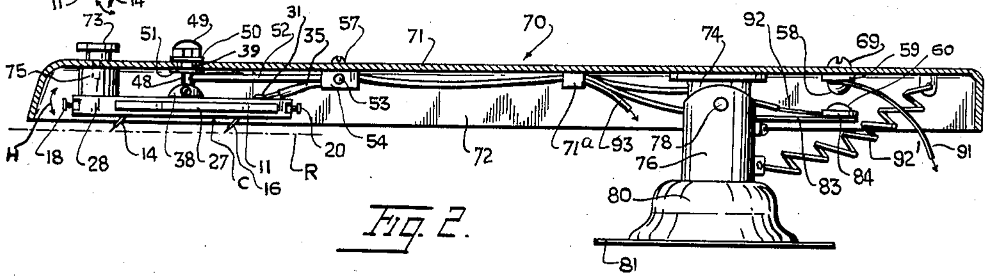
FIG. 2 is a sectional view through a pickup arm showing a cartridge and associated parts in side elevation.

Referring to FIGS. 2 and 3, there is shown an arm 72 which is formed generally as an elongated substantially rectangular box with open bottom. Near the rear end of the arm is secured a post 74 mounted in a slotted sleeve 76. The post pivots on a horizontal axis on a pintle 78 disposed horizontally in the sleeve. The sleeve is pivotable on a vertical axis. The sleeve is carried by a mounting member 80 having an apertured flange 81 for securing the member 80 by screws to a flat, horizontal, stationary support. The arm is intended to be mounted adjacent a phonograph turntable (not shown) which will carry a phonograph record R to be tracked by the styli. The record is indicated only diagrammatically by a dotted line in FIG. 2.

Mounted pivotally on the top 71 of the arm 72 is a knob 73 carrying a cylindrical member 75. This member is eccentrically supported on a pin extension 77 of the knob inserted in eccentric recess 77 in member 75; see FIG. 4. Member 75 is located under the arm and serves as a cam stop to define the initial position of the cartridge unit at the start of play of a record. The knob is formed with a pointer $73^a$ to coact with indexing means (not shown) on the top 71. The cartridge unit C is shown mounted under the arm. The shank 48 of the T-bar extends vertically through a hole 39 in the arm 72 so that the cartridge and holder are pivotable on a vertical axis. Washer 50 and flange 51 space the cap nut and rod from the opposite sides of the top wall 71 of the arm. Solenoid 54 is secured by screw 57 to the wall 71. An eye bracket element $71^a$ supports the lead wires which pass rearwardly from the solenoid and cartridge.

Contact 58 is mounted at the underside of an insulator 59 secured by screw 69 under wall 71. A spring arm 83 carries an insulator 84 on which is mounted contact 60. The arm 83 is secured to sleeve 76. The arm 83 locates the contact 60 adjacent to and slightly spaced from contact 58 so that when arm 72 is lifted the contacts 58 and 60 touch each other to close a circuit via leads 91–93 so that a D.C. power supply indicated in FIG. 1 can energize the solenoid. When the solenoid is energized, the plunger 53 is retracted to pivot the cartridge and holder on shank 48 against the cam stop member 75.

The cam stop member when turned by knob 73 as indicated in FIGS. 3 and 4, can be positioned to any one of three positions marked by indicia 90 for 7″, 10″ and 12″ records, which are the three sizes of records most commonly played. The arm 70 is normally counterbalanced by a spring 92′. It may be lifted manually or mechanically at the end of play of a record whereupon the contacts 58, 60 will be closed to reposition the cartridge and its holder. Repositioning is necessary because as a record is being played, the cartridge holder turns slightly on its vertical axis to accommodate to the changing curvature of the spiral groove being tracked. The automatic return of the cartridge to its initial playing position insures that the two styli will both be located in the same turn of the groove G. Since the curvature of the outermost turn of the tracks of different sizes of records are different it is necessary to provide a cam stop structure such as member 75 to insure proper initial positioning of the styli.

Since one stylus reproduces 45° recording on channel 1 and the other stylus reproduces the opposite 45° recording on channel 2, it is possible to employ the dual cartridge for delayed stereo pickup. In this type of recording, a single groove is impressed with two separate signals into two 45° depressions, the 45° depressions on one side will carry the signals of one stereo channel and the opposite 45° depressions carry the signals of a second stereo channel. The opposite 45° second stereo channel is delayed slightly in time in being recorded so that the two spaced styli pick up simultaneously signals from the two stereo channels which were originally generated at the same time. If the two 45° double depression recordings in the groove are independent monaural or stereo channels, then the two stereo styli can drive two independent sound reproducing channels. By properly positioning the styli in the cartridge they can be caused to track in adjacent grooves rather than in the same groove. The dual cartridge can then be used for stereo or dual monaural signal pickup from adjacent monaural or stereo 45°—45° recorded tracks.

Figure 6:
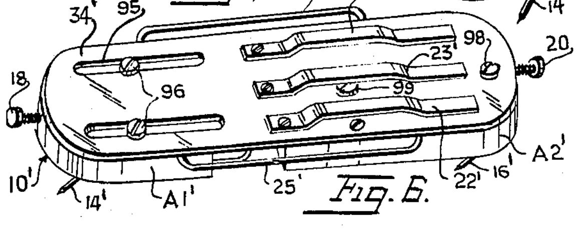
FIG. 6 is a perspective view of a cartridge member which may be employed in the cartridge of FIG. 5.

FIGS. 5 and 6 show a modified cartridge unit C′ including a cartridge holder 12′ in which is slidably mounted a cartridge body 10′. This cartridge body has a flat insulation plate 34′ which is slotted at 95 to receive screws 96 by means of which a first electromechanical element A1′ is secured to the plate. The plate is further apertured to receive screws 98, 99 by means of which a second cartridge element A2′ is secured to the plate. The elements A1′ and A2′ carry styli 14′ and 16′ in the same manner as indicated for the body 10. The plate 34′ is formed with laterally etxending flat or round springs 25′ which fit into the grooves 27′ in holder 12′.

Holder 12′ has a rear extension 52′ which is pivotally engaged with plunger 53 of the solenoid 54. The plunger is arranged so that it will retract in coil 56 when the coil is energized and pivot the cartridge unit on shank 48′ of the T-bar 40′. A screw 49′ is provided for removably threading in threaded hole $48^a$ in the top of shank 48′. A nut 50′ may also be used. Contacts 22′ and 24′ on plate 34′ are connected to electrodes of the several elements A1′ and A2′. The center contact 23′ is connected to electrodes on both elements A1′, A2′. Contacts 31′–33′ on top of holder 12′ make contact with the spring contacts 22′–24′ on the cartridge 10′. Shank 48′ will pivot in hole 39 in the pickup arm 70 in the same manner as indicated for cartridge C in FIG. 2.

FIGS. 7–10 show schematically various arrangements of cartridges $10^a$–$10^d$. Cartridge $10^a$ in FIG. 7 has four wires 100–103 connected to two magnet coils with armature pole pieces 104, 106 which are excited by styli $14^a$ and $16^a$. Wires 100, 101 can be connected to amplifier I and the wires 102, 103 can be connected to amplifier II. If a common ground is desired it can be provided by another wire 108 connected to one terminal of each of the coils.

Figures 8, 9, 10, 11, 12, 13, 14:
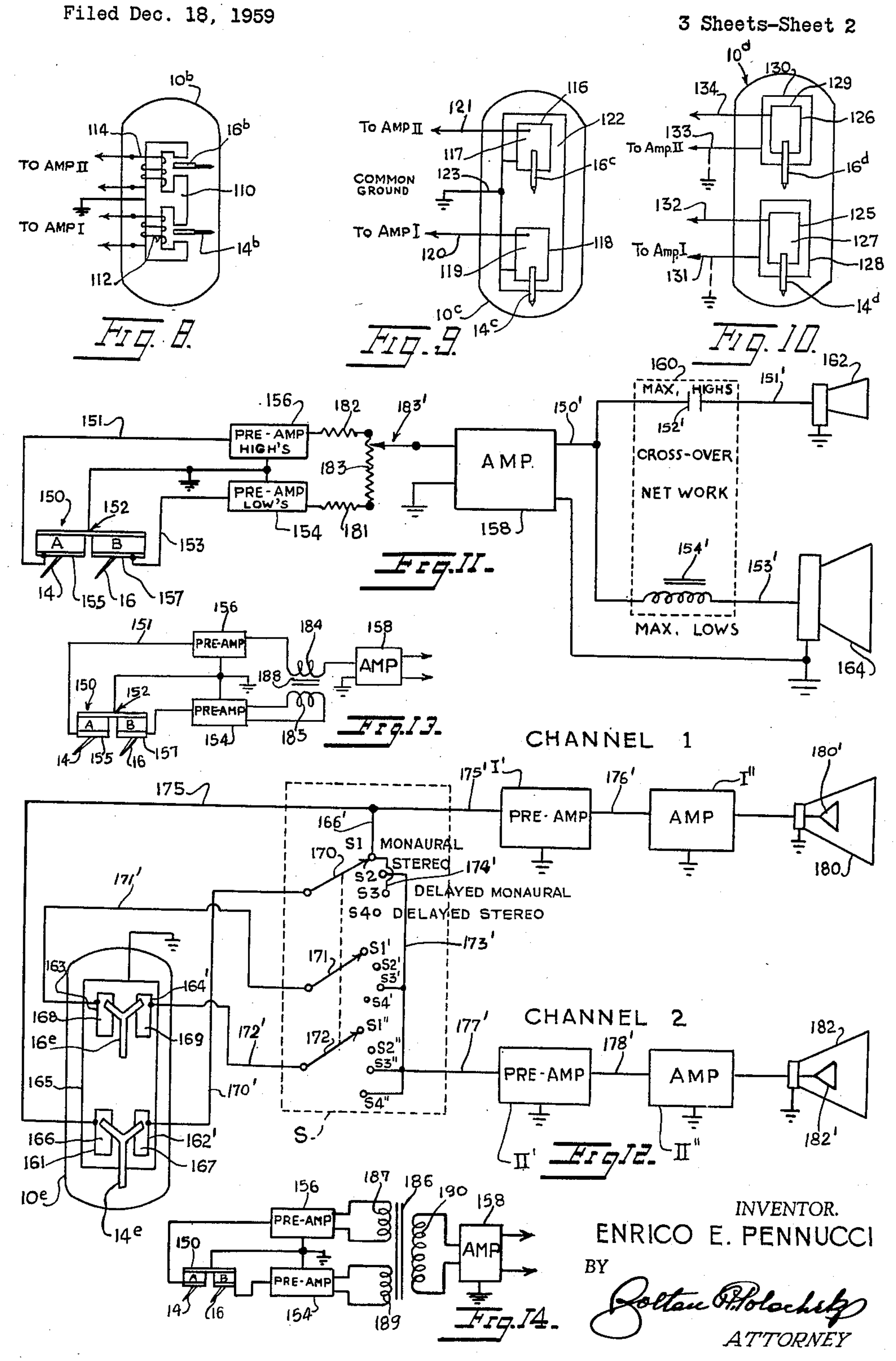
FIGS. 11–14 are circuit diagrams showing different uses of the dual cartridges according to the invention.

FIG. 8 shows cartridge $10^b$ having a single magnet 110 arranged to provide two magnetic circuits. Coils 112 and 114 are wound on different circuit sections of the magnet and may terminate at the amplifiers I and II via separate pairs of wires. Styli $14^b$ and $16^b$ excite the separate coils 112 and 114.

FIG. 9 shows cartridge $10^c$ having two crystal or ceramic elements 116 and 118. Pole pieces 117 and 119 of the several elements may be connected to amplifiers I and II via wires 120, 121. The elements may have a common electrode 122 which may be connected to a common ground via wire 123. Styli $14^c$ and $16^c$ coact with the several elements 116, 118.

FIG. 10 shows cartridge $10^d$ provided with two ceramic or crystalline elements 125, 126 having electrodes 127, 128 and 129, 130, respectively. The electrodes are connected to independent pairs of wires 131, 132 and 133, and 134. If desired, one wire of each pair may be grounded. The styli $14^d$ and $16^d$ are arranged to coact with the respective elements 125, 126. The cartridges $10^a$–$10^d$ may be supported in cartridge units C or C′ such as shown in FIGS. 1 and 5.

FIG. 11 shows schematically a dual monaural cartridge 150 having elements A and B employing a common electrode 152. This electrode is grounded and is connected to ground terminals of preamplifiers 154, 156 which drive amplifier 158 via resistors 181, 182 and 183 through a potentiometer indicated at 183′. One preamplifier is set for highs and the other for lows. The amplifier 158 feeds into a crossover network 160 which separates the high and low audio frequencies and drives the smaller high frequency or tweeter loud-speaker 162 and larger low frequency or woofer loud-speaker 164 to produce three-dimensional sound effects, the loud-speakers being of a coaxial type. Wires 151 and 153 are connected from the pole pieces 155, 157 of the individual electromechanical elements to the respective preamplifiers 154, 156. The crossover network 160 includes a wire 150' leading from amplifier 158. A wire 151' connects wire 150' to loud-speaker 162. A condenser 152' is interposed in wire 151'. A wire 153' connects wire 150' to loud-speaker 164 and a low frequency induction coil 154' is interposed in wire 153'. FIG. 11 illustrates the use of a dual monaural cartridge to drive a single main amplifier in two monaural high and low frequency channels, one of which is delayed in time in being recorded on the common track from which styli 14 and 16 pick up the signals of the channel.

FIG. 12 illustrates schematically the use of a dual stero crystal or ceramic cartridge 10$^e$. This cartridge has a pair of electromechanical elements 161, 162' excited by a (45°—45° of same groove) stylus 14$^e$ and another pair electromechanical elements 163, 164' excited by a second (45°—45° of same groove) stylus 16$^e$. The cartridge has as electrode 165 which is common to all elements and is grounded. The elements have electrodes 166–169 respectively independent of each other. In circuit with the cartridge is a switching means in the form of a four-position switch S having three ganged poles 170–172. Each pole rotates to contact in turn a group of contacts S1–S4, S1'–S4', or S1''–S4''. Pole 170 is connected to electrode 167 by wire 170'. Pole 171 is connected to electrode 168 by wire 171'. Pole 172 is connected to pole piece 169 by wire 172'. Electrode 166 is connected to contact S1 by wires 175 and 166'. Contacts S2, S3', S3'' and S4'' are interconnected by wire 173'. Contacts S1 and S3 are both connected to electrode 166 and to a preamplifier I' in channel 1 by wires 174' and 175', respectively. The preamplifier is connected by wire 176' to an amplifier I'' which drives a loud-speaker 180 having a tweeter 180'. Preamplifier II' in channel 2 is connected to contacts S2, S3', S3'' and S4'' by wire 177'. This preamplifier is connected by wire 178' to amplifier II'' which drives loud-speaker 182 having a tweeter 182'. The circuit of FIG. 12 also produces three-dimensional sound effects.

The switching means has four positions designated Monaural, Stereo, Delayed Monaural and Delayed Stereo. In the first or monaural position, as shown in FIG. 12, pole pieces 168 and 169 terminate at open contacts S1' and S1''. This deactivates the elements 163, 164' excited by rear stylus 16$^e$. The forward stylus 14$^e$ excites elements 161, 162' whose pole pieces 166, 167 both are connected in parallel to drive channel 1 monaurally. Channel 2 is deactivated. In the second or stereo position, channel 1 is fed with signals produced by element 161 and channel 2 is fed with signals from element 162' delivered via contact S2. Contacts S2' and S2'' are open. The single stylus 14$^e$ picks up signals from a groove which has both 45°—45° channels of each signal impressed upon it. The elements 161 and 162' are arranged so that one element only responds to a 45° channel vibration of the stylus while the element 162' responds only to the opposite 45° channel vibration.

When the switch is in the third or delayed monaural position, both elements 161 and 162' drive channel 1 in parallel through contact S3 and wires 175, 166' and 174'. Element 163 and element 164' drive channel 2 in parallel via contacts S3' and S3'' and wires 171' and 172'. In the fourth or delayed stereo position, elements 162' and 163 which are on opposite sides of the cartridge are deactivated since the poles 170 and 171 are at open contacts S4 and S4'. Thus, the 45° signal vibration responding element 162' and the opposite 45° signal vibration responding element 163 cannot generate interfering signals with elements 164' and 161, respectively. Channel 1 is driven by element 161 via wires 175 and 175', and channel 2 is driven by element 164' via contact S4'' and wires 172' and 177'. The styli pick up signals from the same turn of a single record groove recorded in delayed signal fashion as mentioned previously.

FIG. 13 shows an alternate time delay arrangement for the circuit of FIG. 11, in which the preamplifiers 154, 156 have a mutually coupled output provided by coils 184 and 185 of transformer 188. The output of preamplifier 154 is fed to primary coil 185 and this is coupled to secondary coil 184. Preamplifier 156 drives secondary coil 184 directly which feeds amplifier 158. The preamplifier 156 is set for highs and the preamplifier 154 for lows.

FIG. 14 shows still another time delay circuit arrangement in which the outputs of preamplifiers 154 and 156 drive primary windings 187, 189 of transformer 186. The input for amplifier 158 is taken from secondary winding 190.

Figures 15, 16:
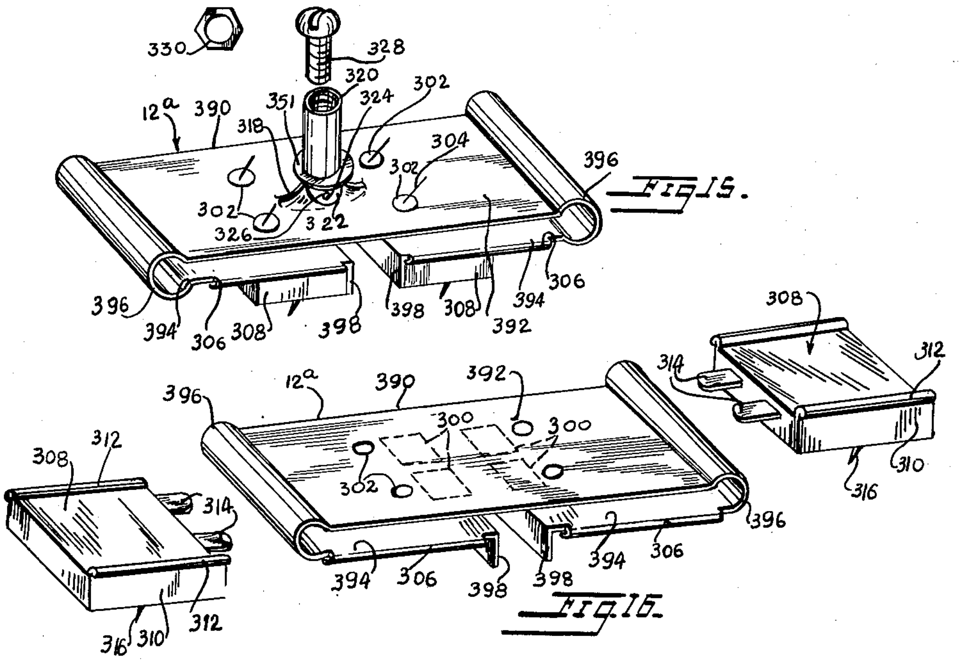
FIG. 15 is a top perspective view of a modified form of cartridge holder assembly.
FIG. 16 is a disassembled part top perspective and part diagrammatic view of the cartridge holder assembly of FIG. 15, on an enlarged scale, parts being omitted.

In FIG. 15, a modified form of cartridge holder assembly 12$^a$ is shown. The cartridge holder 12$^a$ comprises a metal body 390 rectangular in plan and formed from a rectangular strip of thin sheet metal turned upon itself to provide a top wall 392 and a closely spaced split bottom wall forming bottom wall sections 394, 394. At each end of the body where the material is turned upon itself, the end is bowed or looped as indicated at 396 in order to provide a spring effect. The free inner ends of the bottom wall sections 394, 394 are turned downwardly forming depending flanges 398, 398. A pair of spaced tubular shaped stationary contacts 300 are supported on the inner surface of each flange 398, opening toward the ends of the body. The top wall 392 is formed with spaced openings 302 providing clearance for conductors 304 leading to the contacts. The long side edges of the bottom wall sections 394, 394 are formed with curved guide gutters 306, 306.

In FIG. 16, the holder 12$^a$ is adapted to hold two separate phonograph cartridges 308, 308. Each cartridge comprises electromechanical mechanisms in a rectangular-shaped body 310, with overhanging beaded portions 312 along the top side edges thereof. At one end of the body 310, a pair of metal contact prongs 314 are mounted and protrude outwardly of the end forming an extension of the body. The prongs are spaced to correspond to the spacing of the stationary tubular contacts 300, 300 on the flanges 398, 398. The cartridges 308, 308 are adapted to slide under and along the bottom wall sections 394, 394, with the beaded portions riding in the gutters 306, 306, so as to plug the prongs 314, 314 into the stationary contacts 300, 300, to close the circuit. The cartridges support styli 316, 316. One stylus is adapted to vibrate 45° on one side of the recorded groove and the other stylus is adapted to vibrate 45° on the other side of the groove so that when the styli are tracking a single stereo recorded groove one stylus will pick up 45° engraved recorded signals and the other stylus will pick up 45° engraved signals opposite the other 45° recorded signals. Both 45° channels are 90° from each other. The styli can also be used on monaural grooves.

According to this form of cartridge holder assembly, means is provided for assuring that the points of the styli or needles are both of equal depth in the groove, that is, so that one will not be up and the other down. For this purpose the center of the top wall 392 of the cartridge is formed with a perforated ear 318 running longitudinally of the wall. A tubular member 320 having a flat closed end 322 is pivotally mounted on the ear 318. This mounting comprises an opening 324 in the flat closed end 322 aligned with the opening in the ear 318. An adjusting screw 326 extends through the aligned openings providing a horizontal axis whereby the tubular member 320 may be swung vertically to the left or right as viewed in FIG. 15 to adjust the cartridge to the irregularities found in practice and provide a fixed angle that is horizontal to the record, whereby the points of the styli are held in an even keel. The open top end of the tubular member 320 is closed by a screw 328. The tubular member may, however, be externally screw threaded to receive a nut 330 for closing the open top end if desired. A flange 351 is formed on the bottom end of tubular member 320.

FIGS. 17, 18 and 19 show schematically other arrangements of cartridges 10$^e$, 10$^f$ and 10$^g$ with the styli slightly offset in alignment from each other for adjacent tracking. Cartridge 10$^e$ in FIG. 17 has four wires 200, 201, 202 and 203 connected to two magnet coils with armature pole pieces 204 and 206 which are excited by styli 14$^e$ and 16$^e$, respectively. Wires 200 and 201 can be connected to amplifier I and the wires 202 and 203 can be connected to amplifier II. The armature pole pieces are offset laterally and vertically from each other.

Cartridge 10$^f$ in FIG. 18 has six wires 208–213 connected to three magnet coils with armature pole pieces 214, 215 and 216 which are excited by styli 14$^f$, 16$^f$ and 18$^f$. The pole pieces are offset laterally from each other. Wires 208 and 209 can be connected to amplifier I; wires 210 and 211 to amplifier II, and wires 212 and 213 to amplifier III.

FIG. 19 shows a cartridge 10$^g$ adapted for operating on two or three adjacent grooves. Four wires 218, 219, 220 and 221 are shown for two groove operation. Wires 218 and 219 are connected to amplifier I, and wires 220 and 221 are connected to amplifier II. The transducer elements 222 and 223 are offset laterally from each other but are disposed on the same horizontal plane.

A third transducer element 224 with wires 225 and 226 leading to amplifier III is shown in dot-dash lines. The element 224 is disposed in the same horizontal plane but in a different vertical plane from the other elements. The pole pieces 222, 223 and 224 are excited by styli 227, 228 and 229, respectively.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A phonograph pickup assembly, comprising an arm, a support for said arm, means for pivoting said arm on vertical and horizontal axes with respect to a horizontal turntable of a phonograph, a frame-like cartridge holder carried by said arm near one end thereof, said holder being freely pivotable on a second vertical axis, a cam carried by said arm and rotatable on a third vertical axis to extend different portions thereof different predetermined horizontal distances from said third axis transversely of said arm, index means on said arm for indicating different predetermined positions of rotation of the cam corresponding to different diameters of phonograph record disks to be placed on said turntable, said holder being in a predetermined starting position for tracking of said record disk by said cartridge when the holder abuts the cam, electrical contacts carried by said arm and support respectively and connected in circuit with a power supply, said contacts being positioned to close with each other only when said arm is pivoted on said horizontal axis so that said one end of the arm is raised upwardly away from the turntable, and electromagnetic means mechanically connected to said holder to pivot the same on said second axis into juxtaposition with said cam when said electromagnetic means is energized, said electromagnetic means being electrically connected in circuit with said contacts and power supply and being energized only when the contacts are closed as the arm is pivoted on said horizontal axis and said one end thereof is raised upwardly from the turntable.

2. A phonograph pickup assembly according to claim 1, wherein said holder has channel-shaped portions thereon, and a cartridge carrying a plurality of styluses for tracking different points of said record disk simultaneously, said cartridge having ridged portions slidably and removably engaged in said channel-shaped portions of the holder.

3. A phonograph pickup assembly according to claim 2, further comprising external electrical circuits having wires connected to other electrical contacts on said holder, said cartridge having electrical terminals making contact with said other electrical contacts respectively.

4. A phonograph pickup assembly according to claim 1, wherein said holder has channel-shaped portions thereon, and a plurality of stylus carrying cartridges each having ridged portions slidably and removably engaged in said channel-shaped portions of the holder, so that the styluses of all cartridges simultaneously track different spaced points on said record disk, on a single turn of a spiral groove.

5. A phonograph pickup assembly according to claim 4, further comprising electrical circuits having wires connected to other electrical contacts on said holder, said cartridges having electrical terminals making contact with said other electrical contacts respectively.

References Cited in the file of this patent

UNITED STATES PATENTS

| | | |
|---|---|---|
| 2,113,401 | Goldsmith | Apr. 5, 1938 |
| 2,563,860 | Moore | Aug. 14, 1951 |
| 2,586,362 | Martin | Feb. 19, 1952 |
| 2,718,399 | Martin et al. | Sept. 20, 1955 |
| 2,820,854 | Woodworth | Jan. 21, 1958 |
| 2,821,578 | Morrell | Jan. 28, 1958 |
| 2,846,514 | Byrd | Aug. 5, 1958 |
| 2,846,519 | Morrell | Aug. 5, 1958 |
| 2,864,897 | Karr | Dec. 16, 1958 |
| 2,983,517 | Klein | May 9, 1961 |

FOREIGN PATENTS

| | | |
|---|---|---|
| 737,328 | Germany | June 3, 1943 |
| 965,535 | Germany | June 13, 1957 |